United States Patent
Lee et al.

(10) Patent No.: US 7,359,366 B2
(45) Date of Patent: Apr. 15, 2008

(54) UPLINK RANGING SYSTEM AND METHOD IN OFDMA SYSTEM

(75) Inventors: Young-Ha Lee, Daejeon (KR); Jun-Woo Kim, Daejeon (KR); Youn-Ok Park, Daejeon (KR); Seung-Ku Hwang, Seoul (KR)

(73) Assignees: Electronics and Telecommunications Research Institute (KR); Samsung Electronics Co., Ltd. (KR); SK Telecom Co., Ltd. (KR); KT Corporation (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 512 days.

(21) Appl. No.: 10/971,787

(22) Filed: Oct. 21, 2004

(65) Prior Publication Data

US 2005/0141474 A1 Jun. 30, 2005

(30) Foreign Application Priority Data

Dec. 26, 2003 (KR) .................. 10-2003-0097567

(51) Int. Cl.
*H04B 7/208* (2006.01)

(52) U.S. Cl. ............... 370/344; 370/208; 370/350; 375/135; 375/136; 455/101

(58) Field of Classification Search ........... 370/344, 370/208, 350; 375/135, 136, 140; 455/101
See application file for complete search history.

(56) References Cited

U.S. PATENT DOCUMENTS

| | | | | |
|---|---|---|---|---|
| 5,802,121 A | * | 9/1998 | Hiramatsu | 375/368 |
| 6,177,835 B1 | * | 1/2001 | Grebowsky et al. | 329/304 |
| 6,504,883 B1 | * | 1/2003 | Morimoto et al. | 375/343 |
| 2005/0233710 A1 | * | 10/2005 | Lakkis et al. | 455/102 |
| 2006/0078040 A1 | * | 4/2006 | Sung et al. | 375/140 |

FOREIGN PATENT DOCUMENTS

KR 20010082061 A 8/2001
KR 20010082108 A 8/2001

OTHER PUBLICATIONS

Time synchronization in the uplink of an ofdm system, pp. 1569-1573, IEEE 1996.

* cited by examiner

*Primary Examiner*—Danh Le
(74) *Attorney, Agent, or Firm*—Blakely, Sokoloff, Taylor & Zafman LLP

(57) ABSTRACT

Disclosed is a ranging system and method in an OFDMA system. The ranging system includes complex exponential twiddle storage units for respectively storing complex exponential twiddle factors corresponding to a timing error, complex multipliers for respectively complex-multiplying the complex exponential twiddle factors by received uplink ranging data, code correlators for respectively correlating the outputs of the complex multipliers and ranging codes, and threshold comparators for respectively comparing the outputs of the code correlators with a threshold.

10 Claims, 5 Drawing Sheets

UPLINK RANGING SYSTEM AND METHOD IN OFDMA SYSTEM

CROSS REFERENCE TO RELATED APPLICATION

This application claims priority to and the benefit of Korea Patent Application No. 2003-97567 filed on Dec. 26, 2003 in the Korean Intellectual Property Office, the entire content of which is incorporated herein by reference.

BACKGROUND OF THE INVENTION (a) Field of the Invention

The present invention relates to a wireless communication system and method for carrying out effective ranging, for the purpose of solving problems caused by inaccurate synchronization between subscriber stations in an uplink. More specifically, the present invention relates to a system for timing synchronization of an uplink between a subscriber and a base station in a multiple access wireless communication system using OFDMA.

(b) Description of the Related Art

The wireless access standard applied to IEEE 802.16a Wireless MAN-OFDMA PHY layer defines time division access in a downlink from a base station to a subscriber, and an uplink from the subscriber to the base station.

In orthogonal frequency division multiple access (OFDMA), each subscriber transmits data to an uplink through a sub-channel allocated thereto. Here, the subscriber should be connected with a base station during a given time slot for the uplink access. This is because when data is transmitted with sub-carriers allocated to subscribers, orthogonality among the sub-carriers is lost if timing synchronization among the subscribers is not achieved, resulting in interference of data of the subscribers. Accordingly, synchronization in the uplink is important in OFDMA.

To solve the above-described problem, the IEEE 802.16a Wireless MAN-OFDMA standard proposed a ranging method that obtains a timing delay error in a time domain using a pseudo random binary sequence (PRBS) in a frequency domain. Ranging means that a base station estimates a delay distance using a detected PRBS when a subscriber transmits the PRBS to the base station. IEEE 802.16a also proposed methods of demodulating a time domain signal using Fast Fourier Transformer (FFT) and then using Inverse Fourier Transform for ranging.

OFDMA carries out Inverse Fast Fourier Transform (IFFT) in order to modulate data generated in the frequency domain into a time domain, and performs FFT in order to demodulate the time domain signal into the data. Accordingly, a base station demodulator requires an additional IFFT in addition to FFT in order to estimate a delay in the time domain and a distance delayed in the time domain while the delay is detected in the frequency domain. This increases complexity of the configuration of the base station demodulator, and decreases processing speed due to multiple access.

If there is no additional IFFT process, calculations should be carried out in consideration of delay components in various cases. This requires complicated hardware, and the base station demodulator having this configuration is difficult to construct.

SUMMARY OF THE INVENTION

It is an advantage of the present invention to provide a wireless communication system capable of effectively carrying out timing synchronization without performing additional IFFT.

To accomplish the advantage of the present invention, there is provided a ranging system in an OFDMA system, comprising complex exponential twiddle storage units for respectively storing complex exponential twiddle factors corresponding to a timing error; complex multipliers for respectively complex-multiplying the complex exponential twiddle factors by received uplink ranging data; code correlators for respectively correlating the outputs of the complex multipliers and ranging codes; and threshold comparators for respectively comparing the outputs of the code correlators with a threshold.

A ranging system according to another aspect of the present invention further includes address increasers for increasing sub-carrier indexes and outputting them to the complex exponential twiddle factor storage units. The number of complex exponential twiddle factor storage units and address increasers are as many as a number smaller than the number of the complex exponential twiddle factors, and they are arranged in parallel. A plurality of sub-carrier index groups are serially input to the address increasers.

In another aspect of the present invention, a method for processing uplink ranging in an OFDMA system includes a user terminal transmitting ranging data to a base station; complex-multiplying the ranging data by a complex exponential twiddle factor corresponding to a timing error; correlating the complex-multiplied value with a plurality of ranging codes; and comparing the correlation values with a threshold to detect a corresponding ranging code and complex exponential twiddle factor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
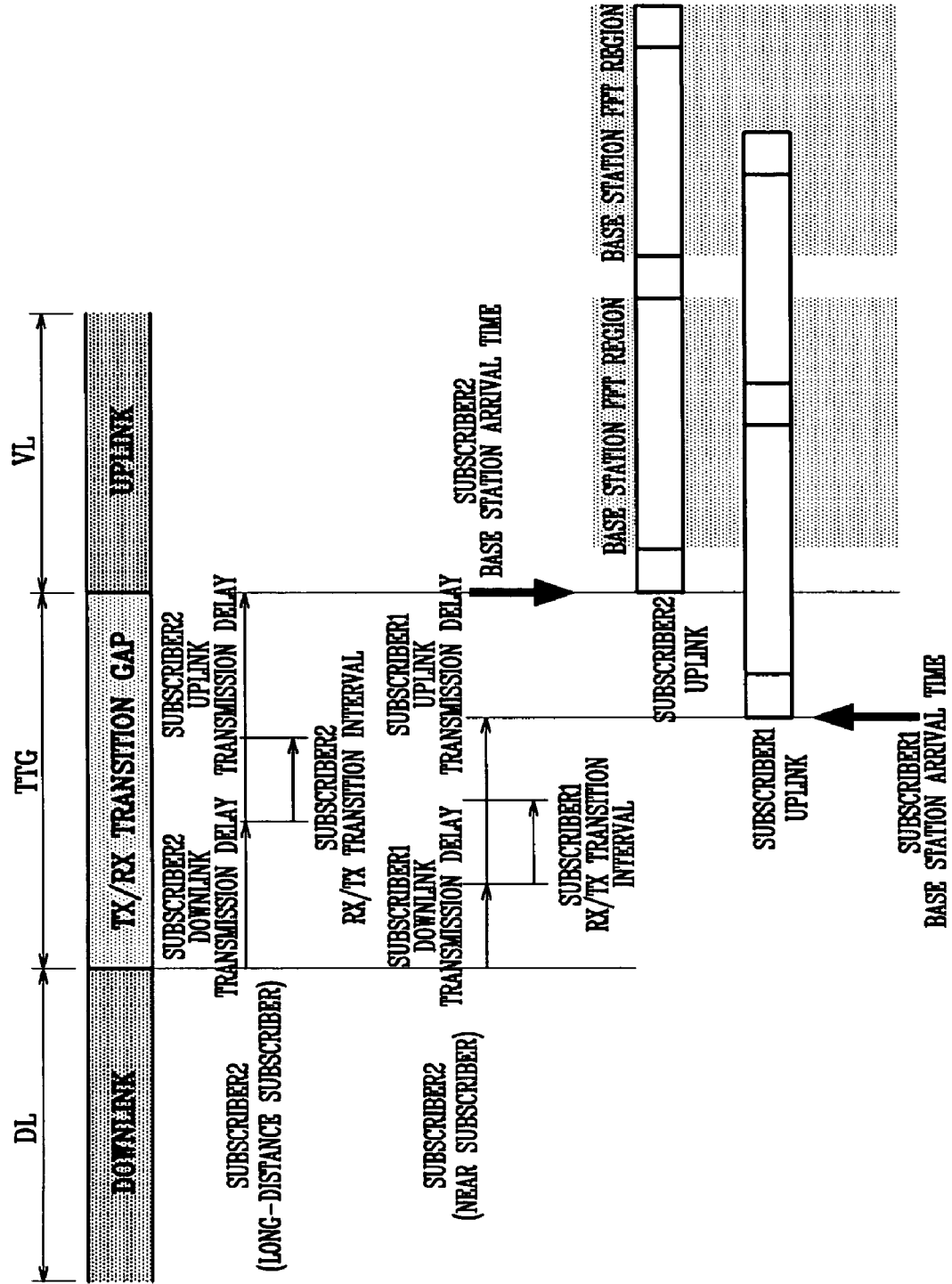
FIG. 1 is a timing diagram showing a synchronization error generated when two subscribers located at different points transmit data to an uplink.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A wireless communication system according to the present invention will now be explained with reference to the attached drawings. First of all, an initial timing error between a subscriber and a base station in an OFDMA system is described.

An OFDMA transmission signal, that is, a transmission signal of the subscriber, is represented as follows.

$$x(n) = \frac{1}{N}\sum_{k=0}^{N-1} X(k) \cdot e^{j\frac{2\pi k n}{N}}, (n = 0, 1, 2, \ldots, N-1) \quad \text{[Equation 1]}$$

Equation 1 is achieved by Inverse Fourier Transform. In Equation 1, x(k) is an input signal and x(n) is an output signal. A base station demodulator demodulates the x(n) through Fourier Transform. If accurate timing synchronization between the base station and the subscriber is not achieved, a complex exponential value with respect to a timing error is multiplied as follows.

$$x(n-\tau) = \quad \text{[Equation 2]}$$
$$\frac{1}{N}\sum_{k=0}^{N-1} X(k) \cdot e^{j\frac{2\pi k(n-\tau)}{N}} = \frac{1}{N}\sum_{k=0}^{N-1} X(k) \cdot e^{j\frac{2\pi k n}{N}} \cdot e^{-j\frac{2\pi k \tau}{N}}$$

When Equation 2 is Fourier-transformed by the base station demodulator, the complex exponential value $$\left(e^{-j\frac{2\pi k \tau}{N}}\right)$$

is left as follows.

$$DFT\{x(n-\tau)\} = X(k) \cdot e^{-j\frac{2\pi k \tau}{N}} \quad \text{[Equation 3]}$$

Here, the demodulator is difficult to analyze the timing error τ because the timing error component has a complex exponential form. Accordingly, the demodulator should carry out Inverse Fourier Transform in order to obtain the timing error τ. However, complexity of the configuration of the demodulator is increased and processing speed is decreased when the demodulator includes an additional Inverse Fourier transformer, as described above.

In the aforementioned OFDM, to detect the timing error is called ranging. The OFDM employs initial ranging, periodic ranging, and bandwidth request ranging using PRBSs. When a plurality of subscribers use different PRBSs in the case of simultaneous multiple access of the subscribers, the PRBSs can be detected even when sub-carriers are simultaneously used, which is identical to spread spectrum.

FIG. 1 is a timing diagram showing a synchronization error generated when two subscribers located at different points transmit data to an uplink.

The initial ranging occurs when a subscriber is initially timing-synchronized with a corresponding base station. The subscriber receives a downlink signal and then transmits an initial ranging code. As shown in FIG. 1, a TX/RX transition gap (TTG) exists between the downlink and uplink in time division duplex. The TTG is related to a cell coverage of the base station, and it is larger than twice the maximum propagation delay between the base station and the subscriber, that is, round drip delay. Accordingly, the initial ranging code arrives in the TTG.

For the initial ranging, OFDMA symbols corresponding to two symbol intervals are transmitted. When the ranging code arrives in the TTG, the base station loses a valid symbol so that the ranging code should be transmitted within two consecutive symbol intervals.

Accordingly, a complex exponential value of the timing error is restricted. Furthermore, since the ranging code is transmitted with only a specific sub-carrier, there is no need to carry out Inverse Fourier Transform for all of demodulated symbols.

In the case of the periodic ranging and bandwidth request ranging, the maximum timing error corresponds to a guard interval. Thus, a complex exponential value with respect to the timing error is reduced. In this case, however, there is only one symbol interval so that ranging should be processed within a single OFDM symbol interval.

Accordingly, the complex exponential value with respect to the timing error has a restricted value. In this respect, a demodulator detects the timing error without performing additional Inverse Fourier Transform in the present invention.

In the meantime, when a complex exponential twiddle factor is removed, only the PRBS the subscriber has transmitted is left. At this time, there is no timing error with respect to the PRBS. Thus, the PRBS can be simply detected only using a conventional code correlator without correcting the timing error.

Embodiments of the present invention will now be explained in detail.

Figure 2:
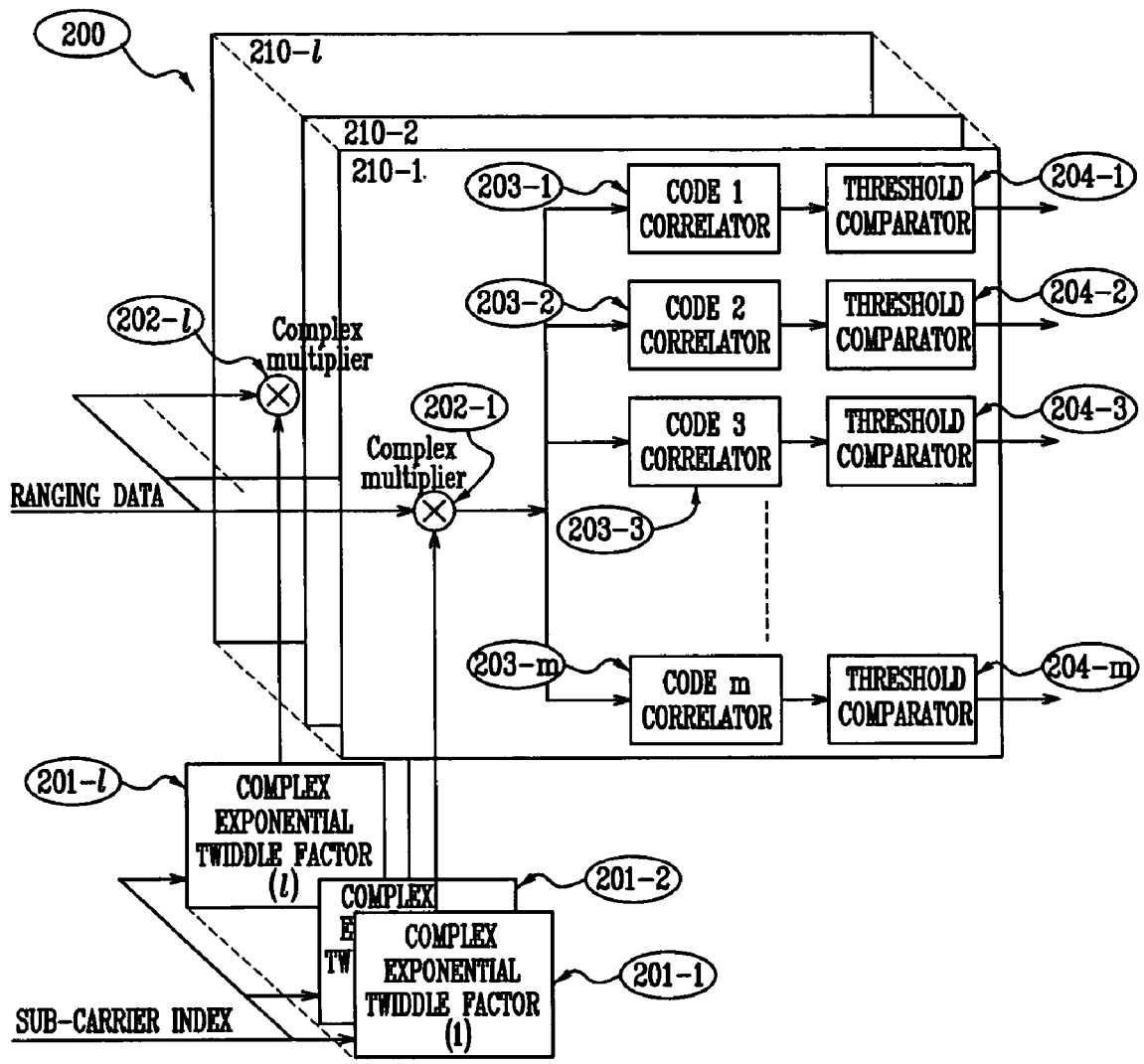
FIG. 2 is a block diagram of a ranging system according to a first embodiment of the present invention.

FIG. 2 is a block diagram of a ranging system according to a first embodiment of the present invention. The ranging system 200 includes complex exponential twiddle factor storage units 201-1 through 201-*l* of as many as the number (l) of timing errors τ, complex multipliers 202-1 through 202-*l*, code correlators 203-1 through 203-*m* of as many as the number (m) of ranging codes, and threshold comparators 204-1 through 204-*m*.

As described above, the ranging system can have a finite number of complex exponential twiddle factor storage units 201-1 through 201-*l* because the number of timing errors is restricted by TTG. A generated timing error component can be removed by complex-multiplying the timing error component by ranging data. Indexes identifying sub-carriers are also in a finite number, which corresponds to the value k in Equation 3.

The complex multipliers 202-1 through 202-*l* multiply the complex exponential twiddle factors corresponding to the sub-carriers indexes k by the ranging data, respectively. From one of the output signals of the complex multipliers 202-1 through 202-*l*, a corresponding complex exponential twiddle factor is removed due to complex multiplication of a corresponding timing error. The output signals of the complex multipliers are input to the code correlators 203-1 through 203-*m* in parallel. The output of a code correlator corresponding to PBRS used in received ranging data, among the code correlators 203-1 through 203-*m*, has the largest value. The output is detected by the threshold comparators 204-1 through 204-*m* so that ranging is carried out.

In the first embodiment of the present invention, parallel processes of as many as the complex exponential twiddle factors are performed to increase ranging processing speed. However, the volume of the ranging system is increased and its structure is complicated.

Figure 3:
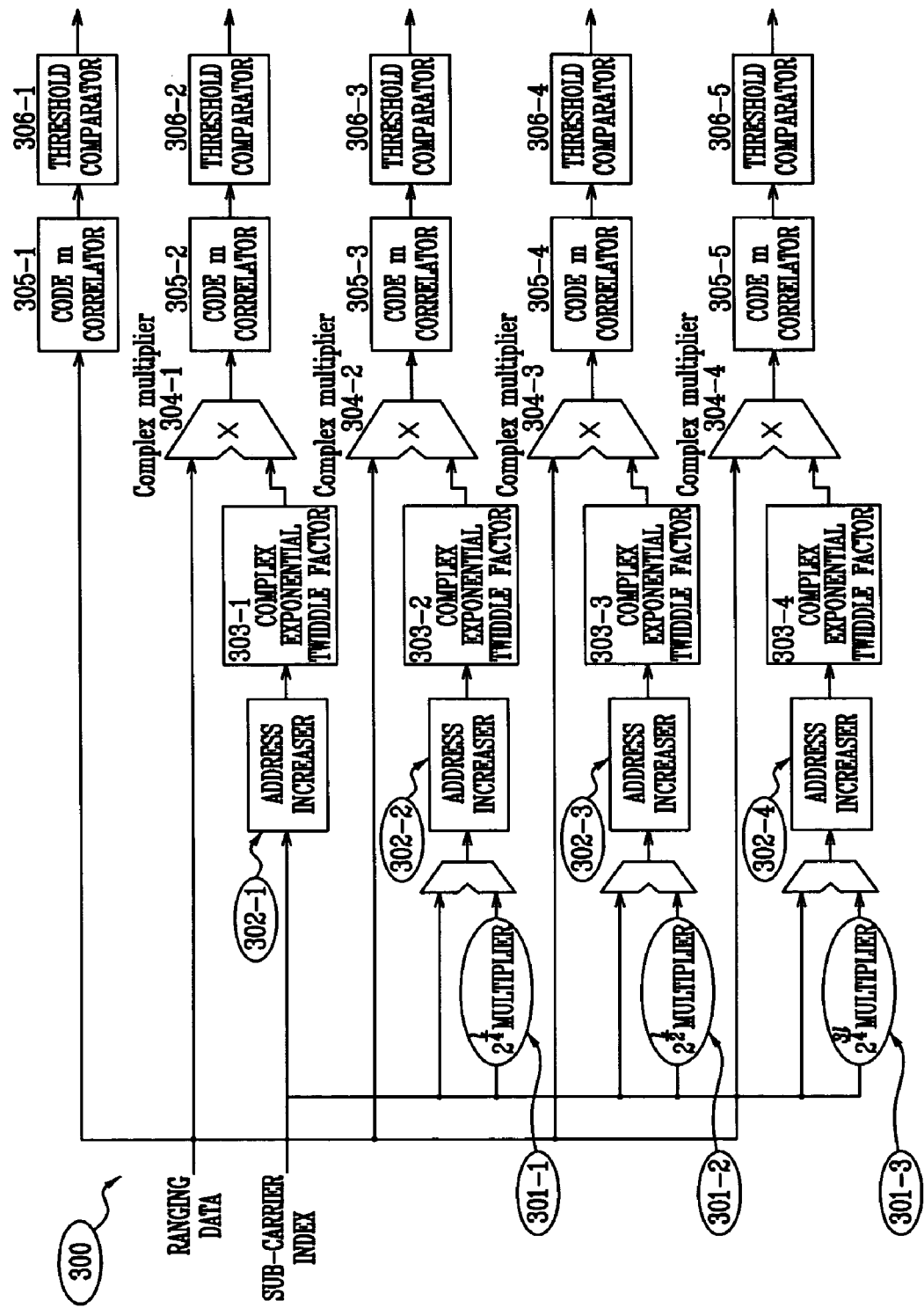
FIG. 3 is a block diagram of a ranging system according to a second embodiment of the present invention.

FIG. 3 is a block diagram of a ranging system according to a second embodiment of the present invention. The ranging system 300 includes only four complex exponential twiddle factor storage units 304-1, 304-2, 304-3, and 304-4, address increasers 302-1, 302-2, 303-3, and 303-4, and multipliers 301-1, 301-2, and 301-3.

The ranging system 300 according to the second embodiment of the present invention calculates a timing error in serial and parallel processing while the ranging system according to the first embodiment of the present invention calculates the timing error in parallel. When multiplication of the complex exponential twiddle factors is processed only in a serial processing, the structure of the ranging system becomes simple and its area is reduced, but ranging speed is decreased.

Accordingly, the ranging system according to the second embodiment of the present invention employs both of serial and parallel processing structures in order to improve the ranging speed while decreasing the area of the ranging system.

As shown in FIG. 3, when the number of the complex exponential twiddle factors is reduced to four, the number of each of the components of l ranging processing units 210-1 through 210-l of FIG. 2 is reduced to four. Since the case that there is no timing error should be considered, the ranging system 300 further includes code correlators 305-1 through 305-5 and threshold comparators 306-1 through 306-5.

When the maximum timing error is 256, for example, the number of the ranging processing units is reduced to five. However, the ranging search should be carried out sixty-four times.

Specifically, k sub-carrier index groups are input to the address increasers 302-1, 302-2, 302-3, and 302-4 sixty-four times. When the k groups are input to the address increasers sequentially sixty-four times, the address increaser 302-1 sequentially increases an address and outputs addresses. That is, the address increaser 302-1 outputs addresses corresponding to the k groups, twice the k groups, three times the k groups, . . . , sixty-three times the k groups. In parallel with the operation of the address increaser 302-1, the address increaser 302-2 outputs addresses corresponding to sixty-four times the k groups, sixty-five times the k groups, . . . , 127 times the k groups. In this manner, the address increasers 302-3 and 304-4 output addresses. Here, the address increasers can easily control the complex exponential twiddle factors in response to unit circle characteristics of the complex exponential twiddle factors.

When processing of the complex exponential twiddle factors in series and parallel is finished, the code correlators 305-1 through 305-5 and the threshold comparators 306-1 through 306-5 perform ranging detection using conventional band spreading.

Figure 4:
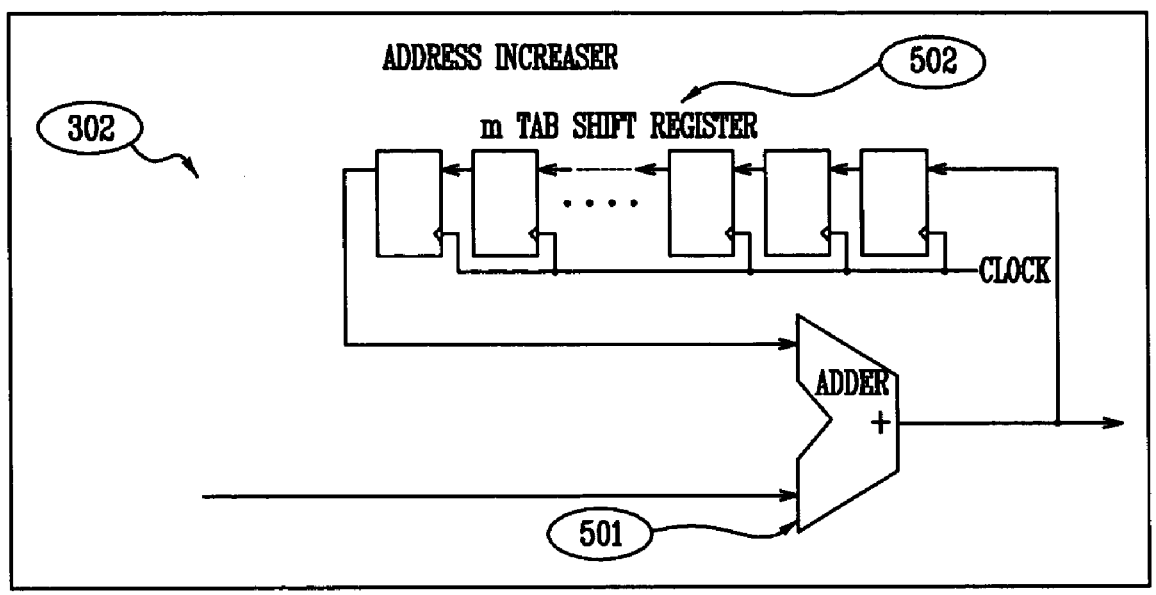
FIG. 4 is a block diagram of the address increaser used in the ranging system according to the second embodiment of the present invention.

FIG. 4 is a block diagram of one of the address increasers 302 used in the ranging system according to the second embodiment of the present invention.

The address increaser 302 consists of an adder 501 and k shift registers 502. When the k sub-carrier index groups are sequentially input to the address increaser 502, the input values are shifted to the left and stored in response to a clock signal. The adder 501 adds the value stored in the last shift register to the input values. When the first k group is output and then the second k group is input, the input value is added to the value of the last shift register so that twice the k group is output. Accordingly, when 64 k groups are sequentially input to the shift registers, 64 times the k group is output finally.

Figure 5:
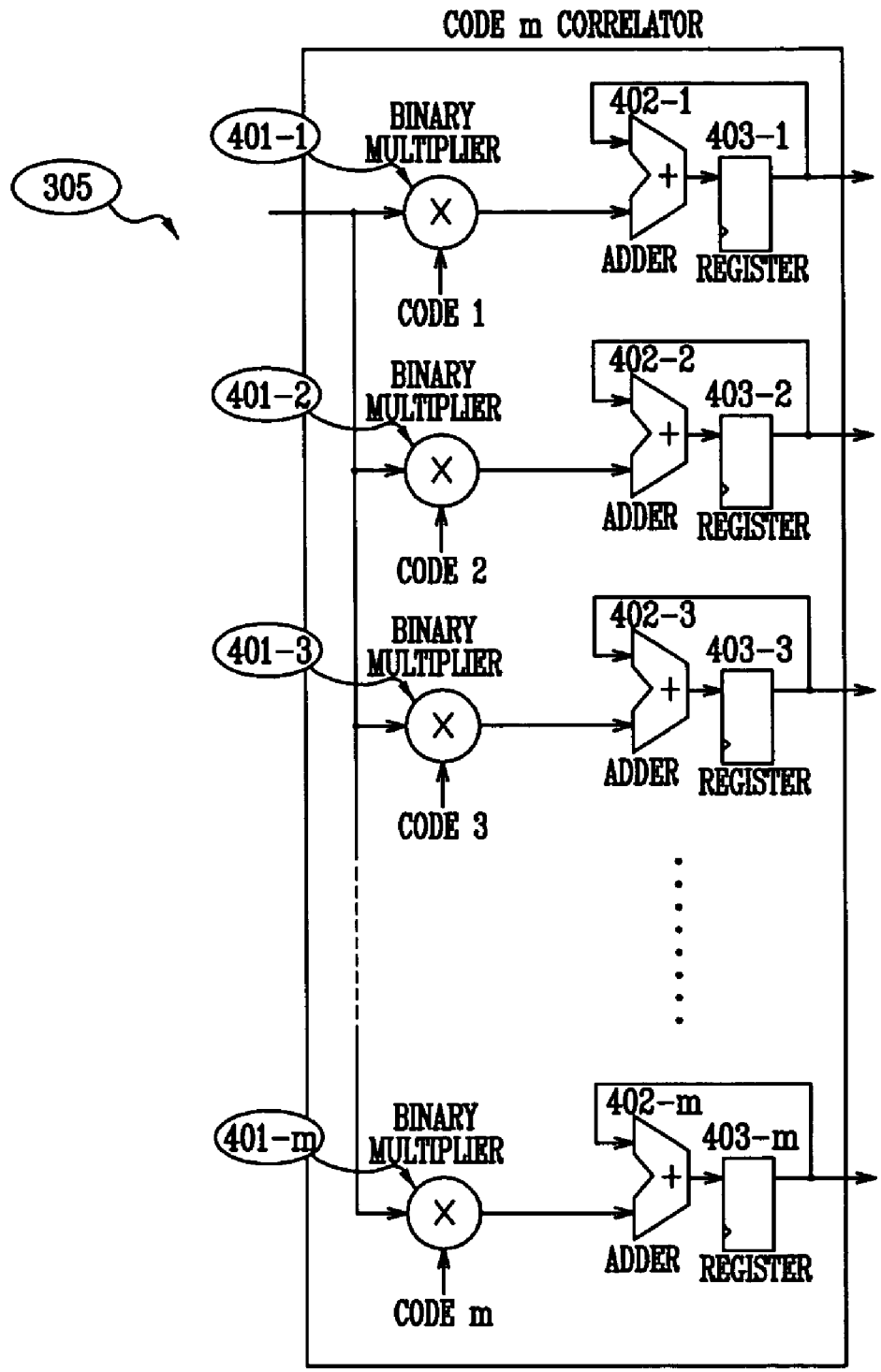
FIG. 5 is a block diagram of a code correlator used in the ranging system of the present invention.

FIG. 5 is a block diagram of one of the code correlators 305 used in the ranging system of the present invention.

Binary multipliers 401-1 through 401-$m$ of the code correlator 305 sequentially multiply ranging data from which a timing error value has been removed by ranging codes 1 through m, respectively. The multiplied binary values corresponding to the period of a single code are added up and stored. Here, if each ranging code consists of +1 and −1, output values of the code correlator 305 shown in FIG. 5 correspond to correlation values of the codes. Thus, it can be known that the ranging code having the maximum value is the code used for ranging. The outputs of the code correlator 305 are transmitted to corresponding threshold comparators to detect a correlation value higher than a threshold. Accordingly, ranging can be successfully carried out on the basis of a correlation code and a complex exponential twiddle factor used for the threshold comparator to calculate the maximum correlation value.

Therefore, the present invention can perform ranging in the base station without having an additional Fourier Transform process and mitigating restrictions on the ranging speed and the place where the ranging system is installed.

While the aforementioned embodiments of the present invention have described the ranging system, a ranging method that sequentially executes functions of blocks of the ranging system is also included in the scope of the present invention.

The ranging system according to the present invention can perform ranging at a relatively high processing speed without carrying out Fourier Transform to detect a complex exponential component of a timing error. In addition, the ranging system requires a small space.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A ranging system in an OFDMA (orthogonal frequency division multiple access) system, comprising:
    complex exponential twiddle storage units for respectively storing complex exponential twiddle factors corresponding to a timing error;
    complex multipliers for respectively complex-multiplying the complex exponential twiddle factors by received uplink ranging data;
    code correlators for respectively correlating the outputs of the complex multipliers and ranging codes; and
    threshold comparators for respectively comparing the outputs of the code correlators with a threshold.

2. The ranging system as claimed in claim 1, wherein the complex multipliers perform complex multiplications of as many as the number obtained by multiplying the number of the complex exponential twiddle factors by the number of sub-carriers.

3. The ranging system as claimed in claim 1, wherein the number of complex multipliers, code correlators, and threshold comparators are as many as the number of the complex exponential twiddle factors, and they process ranging in parallel.

4. The ranging system as claimed in 1, wherein the threshold comparators select a value that exceeds a threshold from values output from the code correlators to detect a corresponding ranging code and a complex exponential twiddle factor.

5. A ranging system in an OFDMA (orthogonal frequency division multiple access) system, comprising:
  complex exponential twiddle storage units for storing complex exponential twiddle factors corresponding to a timing error;
  address increasers for increasing sub-carrier indexes and outputting them to the complex exponential twiddle factor storage units; complex multipliers for respectively complex-multiplying the complex exponential twiddle factors by received uplink ranging data;
  code correlators for respectively correlating the outputs of the complex multipliers and ranging codes; and
  threshold comparators for respectively comparing the outputs of the code correlators with a threshold,
wherein the complex exponential twiddle factor storage units and the address increasers are as many as the number of the complex exponential twiddle factors, they are arranged in parallel, and a plurality of sub-carrier index groups are serially input to the address increasers.

6. The ranging system as claimed in claim 5, further comprising an adder that is located before each of the address increasers arranged in parallel, and that outputs the sum of a sub-carrier index input thereto and a specific multiple of the sub-carrier index.

7. The ranging system as claimed in claim 6, wherein the number of the complex exponential twiddle factors and address increasers corresponds to the value obtained by dividing the number of the complex exponential twiddle factors by the number of times of processing serial ranging.

8. The ranging system as claimed in claim 6, wherein each of the address increasers includes a plurality of shift registers of as many as the number of the sub-carrier indexes, and an adder for adding up a sub-carrier index input to the address increaser and a value stored in the last shift register.

9. The ranging system as claimed in claim 5, wherein each of the code correlators includes:
  binary multipliers for respectively multiplying the ranging data by ranging codes in parallel;
  registers for respectively storing the output values of the binary multipliers; and
  adders for respectively adding up the values stored in the registers and the output values of the binary multipliers.

10. A method for processing uplink ranging in an GEDMA (orthogonal frequency division multiple access) system, comprising:
  a user terminal transmitting ranging data to a base station;
  complex-multiplying the ranging data by a complex exponential twiddle factor corresponding to a timing error;
  correlating the complex-multiplied value with a plurality of ranging codes; and
  comparing the correlation values with a threshold to detect a corresponding ranging code and complex exponential twiddle factor.

* * * * *